Nov. 5, 1963 P. DORNIER 3,109,609
AIRPLANE FOR VERTICAL AND HORIZONTAL TAKE-OFF AND LANDING
Filed July 20, 1961 2 Sheets-Sheet 1

Inventor:
PETER DORNIER.
By K. A. Mayr
Attorney.

Nov. 5, 1963 P. DORNIER 3,109,609
AIRPLANE FOR VERTICAL AND HORIZONTAL TAKE-OFF AND LANDING
Filed July 20, 1961 2 Sheets-Sheet 2
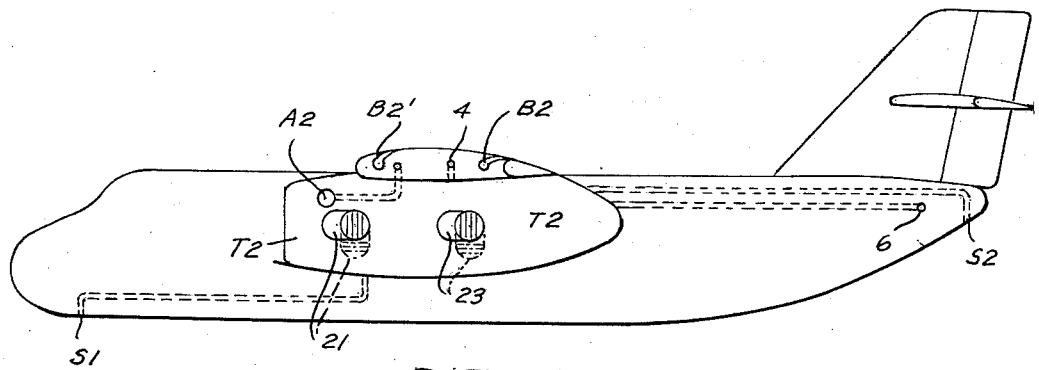
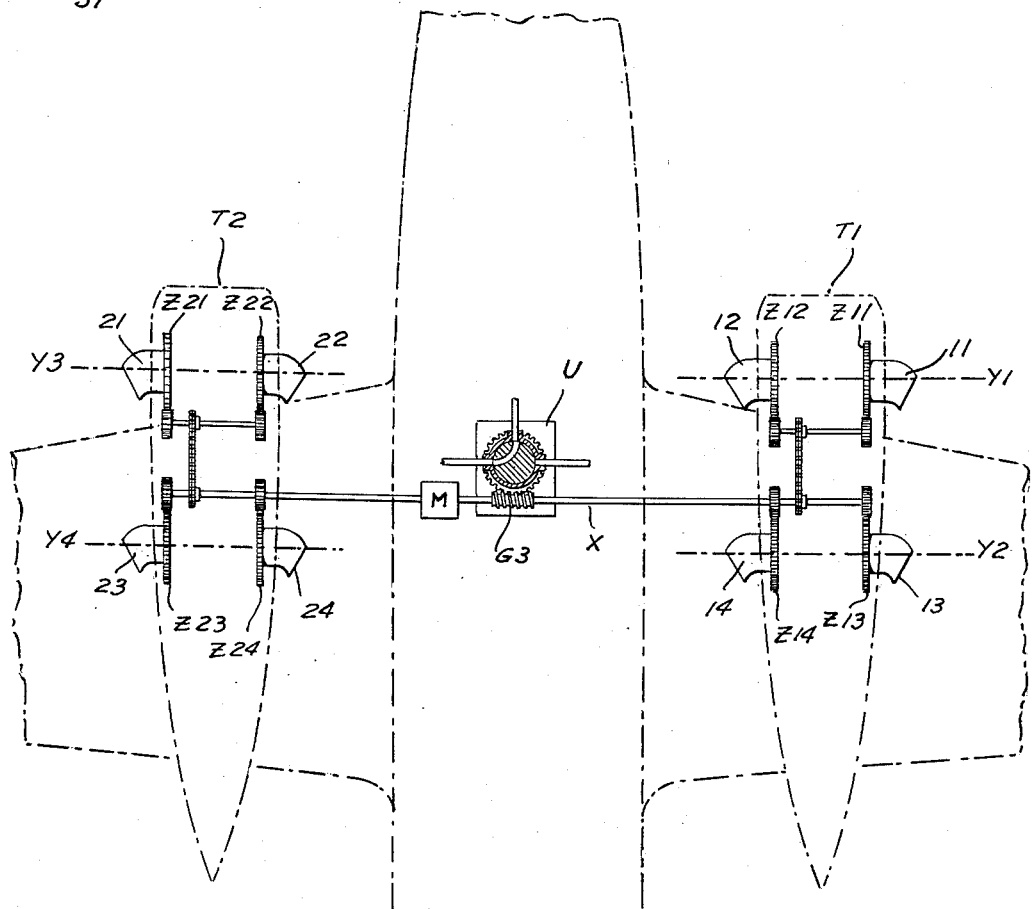
INVENTOR
PETER DORNIER
BY
ATTORNEY

United States Patent Office 3,109,609
Patented Nov. 5, 1963

3,109,609
AIRPLANE FOR VERTICAL AND HORIZONTAL TAKE-OFF AND LANDING
Peter Dornier, Friedrichshafen, Germany, assignor to Dornier-Werke G.m.b.H., Friedrichshafen, Germany, a firm of Germany
Filed July 20, 1961, Ser. No. 125,444
Claims priority, application Germany July 21, 1960
4 Claims. (Cl. 244—12)

The present invention relates to an airplane suitable for vertical and horizontal take-off and landing.

Airplanes capable of taking off and landing in vertical direction are used in increasing numbers, the airplanes changing to horizontal travel without substantially changing the flying position. For the transition from vertical to horizontal movement the thrust producing means are tiltable or include means for changing the direction of the driving jet by approximately at least 90°.

Several difficulties must be overcome when operating airplanes of the aforedescribed type. During normal forward flight lift and steering is done by conventional means such as airfoil and rudder. If the horizontal speed drops below a certain speed and disappears completely at vertical start and landing, the aerodynamic rudder surfaces become ineffective. In conventional airplanes additional steering devices, for example steering jet nozzles, are providedd for hovering. The air for the additional jets is usually supplied by the main drive means, for example by tapping, or by auxiliary compressors. Horizontal starting and landing of the aforesaid high speed aircraft is possible only at very high speeds whereby the possibility of danger is considerably increased, particularly for the landing operation.

When designing airplanes for horizontal starting and landing the main problem is the production of the necessary lift at starting and landing speeds which are low relative to the normal flying speed. In order to increase the lift coefficient numerous designs of blow wings are used which affect the boundary air film. These blow wings increase lift but do not afford vertical start and landing.

An object of the invention is the provision of an airplane suitable for vertical take-off whereby a certain amount of the air which is compressed for producing lift is tapped and conducted to special jet nozzles for steering, and also suitable for horizontal starting.

The airplane according to the invention comprises a control device for selectively supplying a certain amount of tapped compressed air to steering nozzles during vertical start and to conventional devices associated with the wings of the airplane for increasing lift when horizontal start is desired. The invention affords conventional vertical start as well as increase of lift to afford horizontal take-off and landing of the same airplane at low velocities.

The novel features which are considered characteristic of the invention are set forth with particularity in the appended claims. The invention itself, however, and additional objects and advantages thereof will best be understood from the following description of an embodiment thereof when read in connection with the accompanying drawing, wherein:

FIG. 2 is a diagrammatic side view of an airplane according to the invention.

FIG. 3 is a diagrammatic plan view of a part of the airplane shown in FIGS. 1 and 2.

Figure 1:
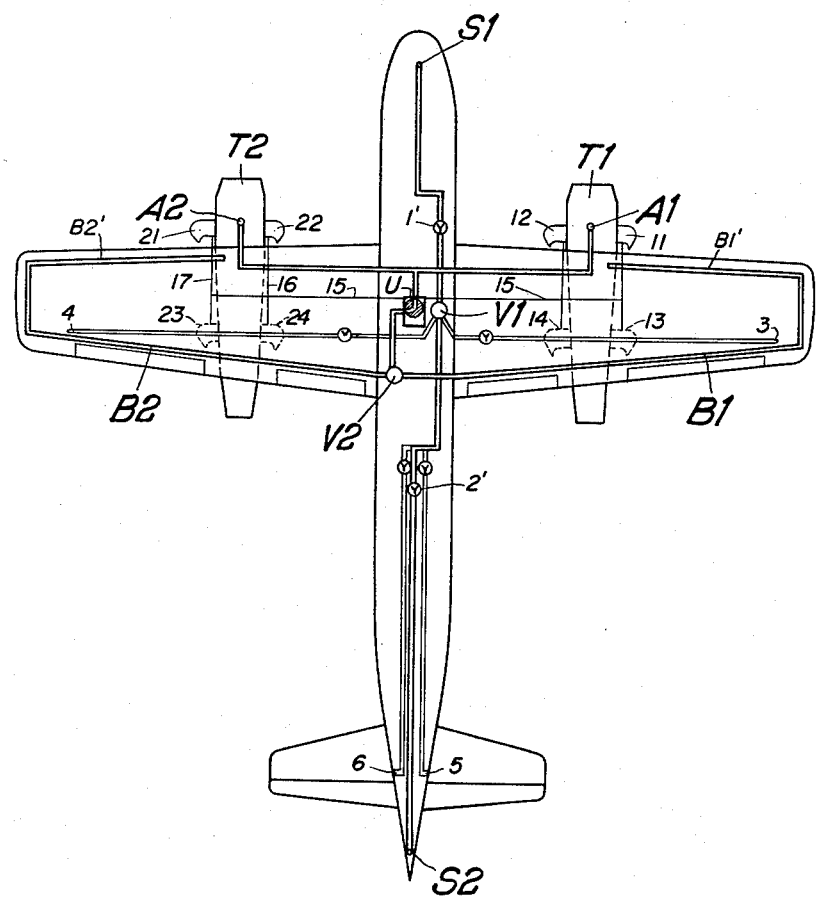
FIG. 1 is a schematic plan view of an airplane according to the invention.

Like parts are designated by like numerals in FIGURES 1 through 3.

Referring more particularly to the drawing, T1 and T2 designate jet type propelling plants of which there is one on each wing. The entire plants or the jet nozzles 11 to 14 and 21 to 24 thereof are tiltable through about 90°. Compressed air is tapped from each propelling plant at A1 and A2. The tapped air is conducted to a control device U for selectively supplying compressed air either to a distributor V1 or to a distributor V2.

For vertical take-off the tapped air is conducted to the distributor V1 which supplies air to a steering jet nozzle S1 in the bow of the airplane and to a steering jet nozzle S2 in the stern. Both nozzles point vertically downward. The pressure of the air supplied to the nozzles S1 and S2 is suitably throttled by valves 1' and 2' for steering the hovering airplane about its horizontal transverse axis. This system for steering around the horizontal transverse axis is conventional and, therefore, here not particularly described.

Additional pairs of vertical steering nozzles 3 and 4 may be provided, for example, at the ends of the wings for steering the airplane about its longitudinal axis. Steering around the vertical axis of the airplane is effected by nozzles 5 and 6 at the tail unit in the conventional manner. The nozzles 3 to 6 are connected to the distributor V1.

For horizontal flying the nozzles of the propelling plants T1 and T2 are in the position shown in the drawings and the control device U directs the tapped air into the distributor V2. The latter supplies air to blower arrangements B1 and B2 arranged in the conventional manner in the wings for increasing lift so that horizontal start and landing is possible at relatively low airplane speed. Air is also conducted from the distributor V2 to ducts B1' and B2' supplying air to conventional spoilers.

FIG. 2 shows the nozzles 21 and 23 in position for horizontal take-off. The position of the nozzles for V.T.O.L. is shown by dotted lines.

FIG. 3 illustrates more particularly the mechanism for tilting the jet nozzles and for simultaneously actuating the control device U. The nozzles 11 and 12 are tiltable around an axis Y1, the nozzles 13, 14 are tiltable around an axis Y2, the nozzles 21, 22 are tiltable around an axis Y3, and the nozzles 23, 24 are tiltable around an axis Y4. The nozzels 11 to 14 and the nozzles 21 to 24 are provided with ring gears Z11 to Z14 and Z21 to Z24, respectively. Each ring gear is driven by a pinion. All pinions are operatively connected to a motor M for simultaneous drive thereby. The motor M also drives the control device U through a worm gear G3. The mechanism shown in FIG. 3 simultaneously actuates the control device U and the nozzles 11—14 and 21—24 so that upon turning of the latter, for example, from the V.T.O.L. position to the horizontal take-off and landing positions, supply of operating gas is switched from the steering nozzles S1, S2, 5, 6 to the blow means B1, B2. FIG. 3 shows the nozzles 11 to 14 and 21 to 24 in position for horizontal start and fast forward flight whereby the control device U causes supply of operating gas to the distributor V2 for increasing lift.

The present invention is not limited to the illustrated example. It can be applied to airplanes having only one or more than two propelling plants. The invention is not limited to arrangements wherein air is tapped from the propelling plants but can also be used in connection with arrangements comprising an auxiliary blower and power plant therefor for supplying the compressed air for steering and for blowing. The control device according to the invention is preferably coupled with the propelling plants, if the latter are tiltable for producing jets selectively in vertical and horizontal direction. This coupling, indicated by lines 15—17, may be so arranged that change of air supply to the steering nozzles to air supply to the blowing means is automatically effected upon a change of the position of the propelling plant or plants for vertical movement of the airplane to the position for horizontal flight and vice versa.

I claim:

1. In an airplane for horizontal as well as for vertical start and landing and having wings, means for selectively producing forward thrust or lift and including means for compressing air, steering jet nozzles for steering the airplane about the vertical and horizontal axes thereof during vertical start and descent, blow means associated with the airplane wings for increasing lift during horizontal start, and control means connected to said air compressing means for receiving compressed air therefrom and connected to said steering jet nozzles and to said blow means for selectively supplying compressed air to said steering jet nozzles when the airplane is hovering or to said blow means during horizontal flight, said forward thrust and lift producing means being tiltable approximately through 90° and said control means being connected thereto for supplying compressed air to said steering jet nozzles when said forward thrust and lift producing means is in substantially vertical position and for supplying compressed air to said blow means when said forward thrust and lift producing means is in substantially horizontal position.

2. In an airplane according to claim 1 and wherein said forward thrust and lift producing means is operatively connected to said control means for automatic actuation of the latter in response to the position of the former.

3. An airplane capable of being selectively started and landed in vertical direction and in horizontal direction, comprising:

a fuselage, wings, at least one jet type propelling plant mounted on each of said wings and having nozzles capable of being turned through substantially 90° for selectively producing lift and forward thrust, said propelling plants including means for compressing air, steering jet nozzles mounted on said fuselage for steering the airplane about the vertical and horizontal axes thereof, blow means mounted on said wings for increasing lift, conduit means connecting said steering jet nozzles and said blow means to said air compressing means for receiving compressed air therefrom, and control means interposed in said conduit means and operable for conducting compressed air to said steering jet nozzles and simultaneously stopping flow of compressed air to said blow means during vertical take-off, and for conducting compressed air to said blow means and simultaneously stopping flow of compressed air to said steering jet nozzels during horizontal take-off.

4. In an airplane for horizontal start as well as for vertical take-off and landing and having wings and jet type propelling means capable of selectively producing forward thrust for horizontal start and lift for vertical take-off and landing:

air compressing means, steering jet nozzles for steering the airplane about the vertical and horizontal axes thereof during vertical take-off and landing, blow means associated with said wings for increasing lift during horizontal start and landing, conduit means connecting said steering jet nozzles and said blow means to said air compressing means for receiving compressed air therefrom, and control means interposed in said conduit means and including means for conducting compressed air to said steering jet nozzles and simultaneously stopping flow of compressed air to said blow means during vertical take-off and for conducting compressed air to said blow means and simultaneously stopping flow of compressed air to said steering jet nozzles during horizontal start.

References Cited in the file of this patent
UNITED STATES PATENTS

| | | |
|---|---|---|
| 2,941,751 | Gagarin | June 21, 1960 |
| 2,959,374 | Laskowitz | Nov. 8, 1960 |
| 3,056,565 | Griffith | Oct. 2, 1962 |